Figure 1:
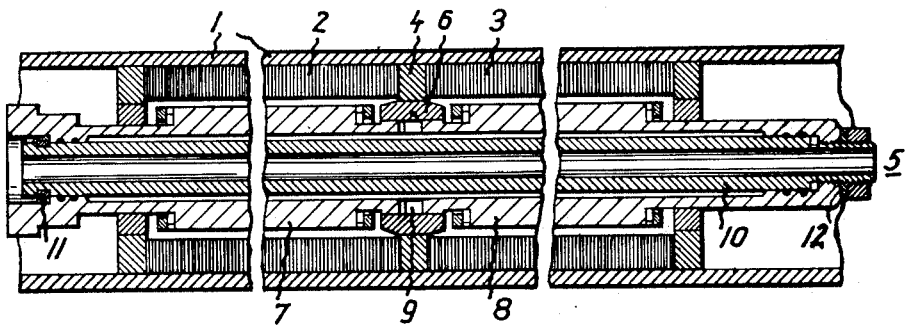

3,136,905
BORE HOLE DRILLING MOTOR
Oskar Zapf, Berlin-Frohnau, and Albert Linsenmair, Berlin, Germany, assignors to Licentia Patent-Verwaltungs-G.m.b.H., Frankfurt am Main, Germany
Filed Aug. 18, 1960, Ser. No. 50,386
Claims priority, application Germany Aug. 25, 1959
3 Claims. (Cl. 310—87)

The present invention relates to electric motors.

More particularly, the present invention relates to electric motors which are especially suited for use in the bore hole drilling art. Motors of this type must be such as to meet the very severe space requirements of bore hole drilling machinery, so that the outside diameter is generally limited to about 20 to 40 cm., while the length of such motors may be as great as 10 m., the precise length depending on the desired power rating of the motor.

One difficulty encountered in motors of this type is that the rotor shaft must be hollow in order to allow rinsing and cooling water to be piped into the bore hole, usually under high pressure. This water is then mixed with the dust or powder obtained by the drilling operation and raised exteriorly of the motor. Thus, the motor is surrounded by active and powerful liquids, so that it becomes important to provide a seal which will protect the moving parts of the motor, as well as the bearings, against the corrosive effect of the water under pressure.

A similar problem is encountered in drive motors for deep-well pumps, insofar as the sealing of moving motor parts against a surrounding liquid is concerned. However, the space limitations in wells are not as extreme as in bore holes, so that it is possible to obtain a certain sealing action against the upwardly pressing water by providing a stationary central tube which extends through the motor, through which tube the water is raised. This stationary tube, however, has to be equipped with a special bearing for the rotor, so that the rotor diameter is not only increased, due to the play which must be left between the rotor and the stationary tube, but also, the sealing effect thus obtained is quite poor, because the water can rise into the space between the stationary tube and the rotor to a level dependent on the water pressure, i.e., the tube acts on the principle of a diving bell and can, therefore, not be used at very great depths. Consequently, it has been found impractical to use an arrangement of the above-mentioned type in bore hole drilling, particularly since the motor has to be connected directly to the bit which operates at great depth, so that the use of stationary tubing and the like is purposely avoided.

It is, therefore, an object of the present invention to provide an electric motor which can be used in bore hole drilling machinery and which overcomes the above disadvantages.

It is another object of the present invention to provide an elongated motor, i.e., a motor having a high length-to-diameter ratio, which can be used in bore holes, the motor being so constructed that water under pressure can be supplied to the drill without injuring the component parts of the motor.

It is a further object of the present invention to provide an elongated bore hole drilling motor of rugged construction which is effectively sealed against the corrosive effect of liquids and which will give long periods of trouble-free service.

With the above objects in view, the present invention resides basically in an electric motor of great axial length, i.e., an elongated motor having a high length-to-diameter ratio, which motor incorporates a hollow rotor composed of two or more rotor portions coupled together by suitable coupling means as, for example, a claw clutch or other positive coupling device. A central tube is provided which is arranged within and attached to the rotor so as to be rotatable therewith. This tube, which serves to conduct water under pressure, is fluid-tightly connected with the ends of the rotor.

Figure 2:
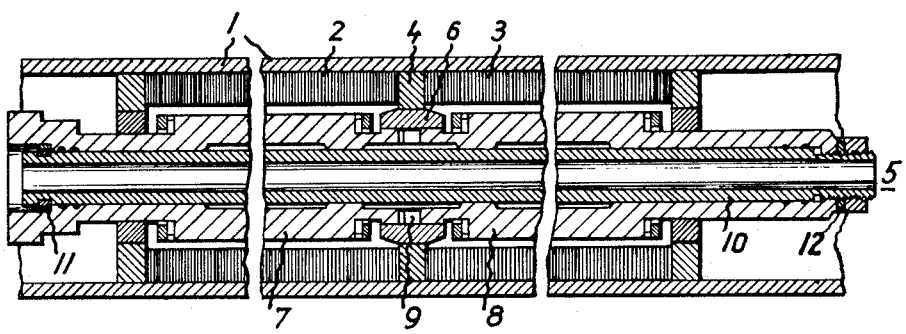

Additional objects and advantages of the present invention will become apparent upon consideration of the following description when taken in conjunction with the accompanying drawings, in which FIGURES 1 and 2 are sectional views of two embodiments of the present invention.

Referring to the drawing and FIGURE 1 thereof in particular, there is shown a motor having a fluid-tight capsule-like housing 1 within which the stator laminations 2 and 3 are arranged. A stationary bearing ring 4 is provided between the laminations 2 and 3 and serves to mount for rotation an elongated hollow rotor indicated generally at 5, this rotor comprising a rotatable bearing 6 and at least two aligned hollow rotor portions 7 and 8. The drawing shows but two such rotor portions, it being understood, however, that any appropriate higher number of rotor portions may be provided so that the composite hollow rotor 5 may consist of any suitable plurality of hollow rotor portions.

Consecutive rotor portions, here the rotor portions 7 and 8, are interconnected by a suitable positive force-transmitting coupling device, as, for example, a claw clutch 9, the details of which are conventional and are, therefore, not illustrated in detail.

According to the present invention, a central tubular member 10 extends through the interior of the composite hollow rotor 5. This tubular member, which serves to conduct water under pressure through the interior of the rotor, is connected to the ends of the rotor 5, for rotation with the rotor, by means of fluid-tight connections indicated at 11 and 12, so that the coupling device is sealed against the water running through the tubular member 10.

It will be seen from the above that due to the tubular member 10, no water can enter the space between consecutive rotor portions. This means that the only considerations affecting the choice of coupling devices between consecutive rotor portions are those involving the torque transmission characteristics, i.e., the physical configuration of the coupling device need not be such as to enable the coupling device itself to be equipped with a seal. It will be appreciated that such problems would arise if the central tubular member according to the present invention were omitted.

It will also be appreciated that the central tubular member, in addition to acting as a seal, will, due to its favorable moment of resistance against torsion, assist in transmitting a turning moment. Also, the central tubular member according to the present invention can be relied on to take up the small axial forces which arise during the assembly of the rotor, and to fix the axial position of each rotor portion which is a function that need not be accomplished by the force-transmitting coupling or couplings between the rotor portions.

The central tubular member can be very thin because, although, as stated above, it will assist in transmitting a turning moment, this is not the primary purpose, it being the coupling devices between consecutive rotor portions which are relied on to do this. Therefore, the amount by which the inside diameter of the rotor is reduced is negligible, i.e., the inside diameter of the rotor without the central tubular member would be only very little greater than the inside diameter of the tubular member itself.

If desired, the inside diameter of the rotor portions 7 and 8 may be such that a force-fit is obtained on the tubular member 10, as illustrated in FIGURE 2 which otherwise is identical to FIGURE 1. In this way, the rotor portions will seat on the tubular member so that the axial position of each rotor portion is firmly secured.

It will be understood that the above description of the present invention is susceptible to various modifications, changes and adaptations, and the same are intended to be comprehended within the meaning and range of equivalents of the appended claims.

We claim:

1. In an electric motor for use in bore holes, the combination which comprises: a plurality of aligned hollow rotor portions; coupling means interconnecting consecutive rotor portions to form an elongated composite hollow rotor; and a single central tubular member extending through said elongated composite hollow rotor and being fluid-tightly connected to the ends thereof, said central tubular member being rotatable with said rotor and adapted to conduct water under pressure through the interior of said elongated composite hollow rotor.

2. The combination defined in claim 1 wherein said coupling means comprise claw clutch means.

3. The combination defined in claim 1 wherein the inside diameter of said hollow rotor portions is such that a force-fit is obtained between said portions and said central tubular member.

References Cited in the file of this patent

UNITED STATES PATENTS

| | | |
|---|---|---|
| 1,350,059 | Blackwell | Aug. 17, 1920 |
| 2,292,126 | Isley | Aug. 4, 1942 |
| 2,315,917 | Arutunoff | Apr. 6, 1943 |
| 2,531,120 | Feaster | Nov. 21, 1950 |